United States Patent [19]

Miller et al.

[11] Patent Number: 5,148,095

[45] Date of Patent: Sep. 15, 1992

[54] PERMANENT POWER PACK FOR COMPUTER CLOCK AND BATTERY BACKED MEMORY

[76] Inventors: Ronald R. Miller, 2520 Malone Pl., Santa Clara, Calif. 95050; Shelton W. Riggs, 987 E. Homestead Rd.; Phil Rozario, 1715 Banff Dr., both of Sunnyvale, Calif. 94087

[21] Appl. No.: 707,688

[22] Filed: May 30, 1991

[51] Int. Cl.⁵ .......................................... H01M 10/44
[52] U.S. Cl. ...................................... 320/22; 307/66; 320/14
[58] Field of Search ........................ 307/66; 320/22, 14

[56] References Cited

U.S. PATENT DOCUMENTS

| | | | |
|---|---|---|---|
| 4,311,952 | 1/1982 | Mabuchi | 320/3 |
| 4,386,308 | 5/1983 | Emile, Jr. et al. | 320/22 |
| 4,563,629 | 1/1986 | Keiper | 320/48 |
| 4,595,872 | 6/1986 | Ball | 320/13 |
| 4,611,161 | 9/1986 | Barker | 320/2 |
| 4,714,868 | 12/1987 | Maruyama | 320/5 |
| 4,760,322 | 7/1988 | Crampton | 320/14 |
| 4,829,224 | 5/1989 | Gandelman | 320/2 |
| 4,860,185 | 8/1989 | Brewer et al. | 363/41 |

OTHER PUBLICATIONS

Inmac Catalog Sep./Oct. 1990, p. 55 (Replacement Battery).

Primary Examiner—Steven L. Stephan
Assistant Examiner—Ben M. Davidson

[57] ABSTRACT

A permanent power pack which replaces the disposable, non-rechargeable, computer clock battery: consisting of a housing (10) containing a rechargeable battery (B1), and supporting electronic circuit comprising an input section (13), a maintenance section (14) and an output supply section (15). From the circuit within the housing (10), an output power connector (P3) and electrical leads (12) supplies power to the computer's clock, battery powered memory and circuitry. The permanent power pack is supplied electrical energy from the computer power supply through a standard disk drive input power connector (P2) and electrical leads (11).

6 Claims, 6 Drawing Sheets

PERMANENT POWER PACK FOR COMPUTER CLOCK AND BATTERY BACKED MEMORY

BACKGROUND

1. Field of Invention

This invention relates to the replaceable personal computer (PC) battery which supplies electrical power to memory containing critical PC system configuration information. This battery also supplies power for the PC's real time clock and possible other circuitry.

2. Description of Prior Art

Many personal computers contain and depend upon an internal non-rechargeable battery. So long as the battery is good, system configuration information is retained when the computer is turned off. Moreover, when the computer is turned on, it accesses its own configuration via this battery powered memory.

Typically, these non-rechargeable batteries last from one to five years before they become inoperative. When a PC battery fails, the PC cannot operate correctly when it is turned on. This is because all critical information in memory which had been powered by the battery has also been lost.

Several brands of these replacement batteries are available at PC supply stores. In most cases, the battery comes equipped with the appropriate output electrical connector which fastens onto the PC motherboard to provide power for this special memory.

Through the output connector, power is furnished to the battery powered memory which contains critical system configuration information which personalizes a particular personal computer (PC). When the battery has failed, this information is lost. Moreover, the real time clock has also failed.

The user of a personal computer containing a replaceable battery is on a battery replacement cycle. Additionally, the user must also replace the lost information when the PC battery dies. This means that the user is also on an information replacement cycle including the resetting of the clock.

Disadvantages of the replaceable PC battery include:

(a) The battery is eventually drained to an inoperative state.

(b) The system configuration information in battery powered memory is lost when the battery fails.

(c) The real time clock fails with an inoperative battery.

(d) The user of a PC containing a replaceable battery is at the mercy of single random event. At some future place and time, the PC battery is most certainly going to fail. The user has no control of when this will happen. Normally, the computer will fail during power up. However, if the battery is marginal, the PC could conceivably start up with erroneous information due to partial memory failure or PC clock failure. In turn, this could cause the computer to fail when running some critical task. Certainly, a PC is rendered useless until its battery has been replaced and its information and clock has been restored.

(e) In order to resume the previous working state of a PC with a spent battery, the user must perform the following replacement cycle:

(1) purchase and take delivery on a new PC battery,
(2) power off, unplug, open PC to expose the dead battery,
(3) remove and properly dispose of dead battery,
(4) install new battery, close PC, plug and power on,
(5) locate and retrieve system configuration information, and
(6) Establish procedure and replace the lost information.

OBJECTS AND ADVANTAGES

Several objects and advantages of this invention include:

(a) This invention provides a permanent power source and a total replacement of the internal computer clock battery.

(b) This invention provides for the elimination of the loss of system configuration information residing in conventional PC battery powered memory due to normal battery depletion.

(c) This invention provides for the elimination of the loss of the real time clock due to battery failure.

(d) This invention provides for the elimination of the consequences of a random battery failure due to normal depletion.

(e) This invention provides for the elimination of the PC internal battery replacement cycle consisting of the following steps:

(1) purchase and take delivery on a new PC battery,
(2) power off, unplug, open PC to expose the dead battery,
(3) remove and properly dispose of dead battery,
(4) install new battery, close PC, plug and power on,
(5) locate and retrieve system configuration information, and
(6) Establish procedure and replace the lost information.

Additionally, if this invention is used before the PC battery has failed, then this invention provides for the complete elimination of the original problem of having to anticipate an unpredictable battery failure.

Further objects and advantages are to provide a more reliable personal computer through the replacement of its battery with this permanent power pack invention designed to last the lifetime of the PC. Moreover, this invention eliminates the problem of the proper disposal of depleted computer clock batteries. Further objects and advantages will become apparent from a consideration of the ensuing description and drawings.

REFERENCE NUMERALS IN DRAWINGS

B1: 9 Volt Nicad
C1: 0.1 microfarad ceramic capacitor
C2: 0.02 microfarad ceramic capacitor
C3: 4.7-100 microfarad electrolytic capacitor
D1: 8.7 Volt Zener Diode
D2: Silicon Signal Diode
D3: Light Emitting Diode (LED)
D4: 5.1 Volt Zener Diode
IC1: LM358 operational amplifier
P1: 9 Volt Battery Clip
P2: Standard PC Disk Power Input Connector
P3: Standard output PC Motherboard Connector
R1: 3.9K ¼ Watt or ⅛ Watt resistor
R2: 20K ¼ Watt or ⅛ Watt resistor
R3: 100K ¼ Watt or ⅛ Watt resistor
R4: 100K ¼ Watt or ⅛ Watt resistor
R5: 1K ¼ Watt or ⅛ Watt resistor
10: Plastic Housing
11: Input power leads
12: Output power leads

DESCRIPTION—FIGS. 1 TO 4

Figure 1:
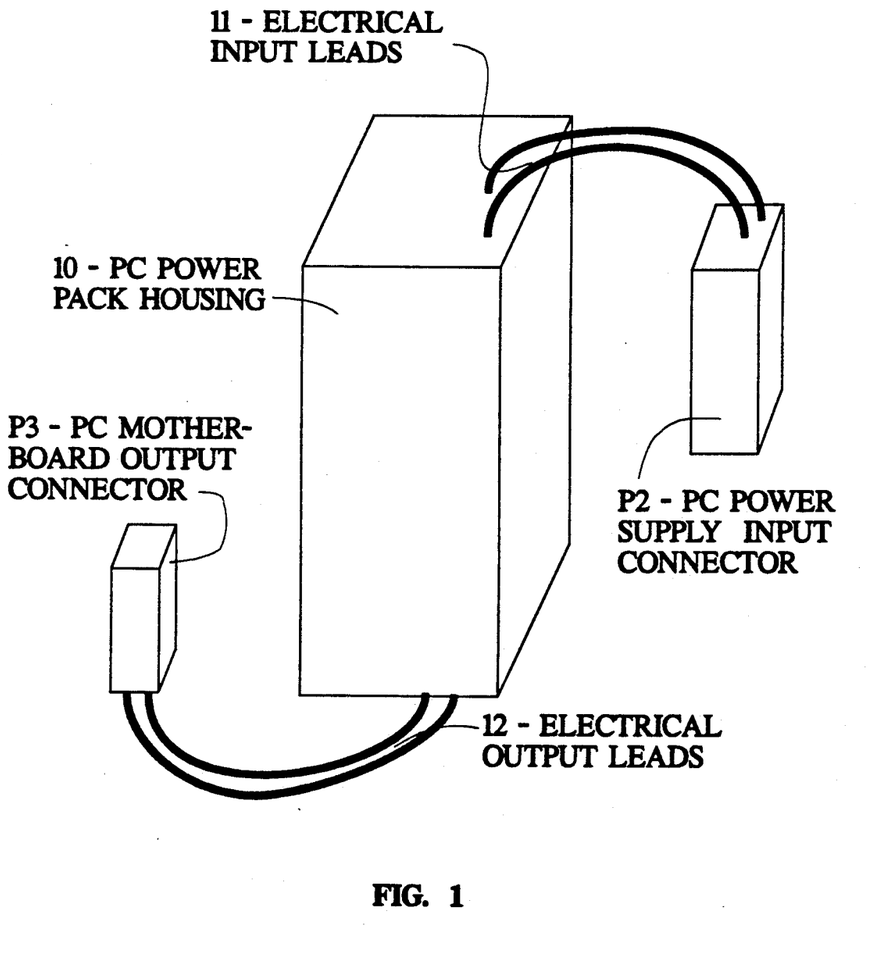
FIG. 1 illustrates a perspective view of a typical embodiment of this invention.

A typical embodiment of the invention is illustrated in FIG. 1. Within the personal computer (PC) power pack housing 10 is a nine volt type nicad battery along with all the supporting electronic components mounted on a circuit board.

A typical embodiment of a non-rechargeable, consumer replaceable, disposable computer clock battery can be visualized with the help of FIG. 1. If both the electrical input leads 11 and the power supply input connector P2 are removed from FIG. 1, then what would be shown is the main components (housing 10, electrical output leads 12 and output connector P3) of a typical non-rechargeable, disposable computer clock battery.

Typical housing material include plastic, aluminum or other materials.

From the supporting electronics within the housing are a set of input leads 11 connected to power connector P2 and a set of output leads 12 connected to output connector P3. P2 is a standard PC disk drive input connector. P3 is a standard PC motherboard output connector.

Typical dimensions of the housing 10 are 2×3/2×⅜ cubic inches. These dimensions are almost in direct proportion to the size of the battery that is chosen. Typical nine volt batteries are roughly 15/8×1×⅞ cubic inches. The circuit board assembly is roughly 5/4×⅝×¼ cubic inches.

Figure 2:
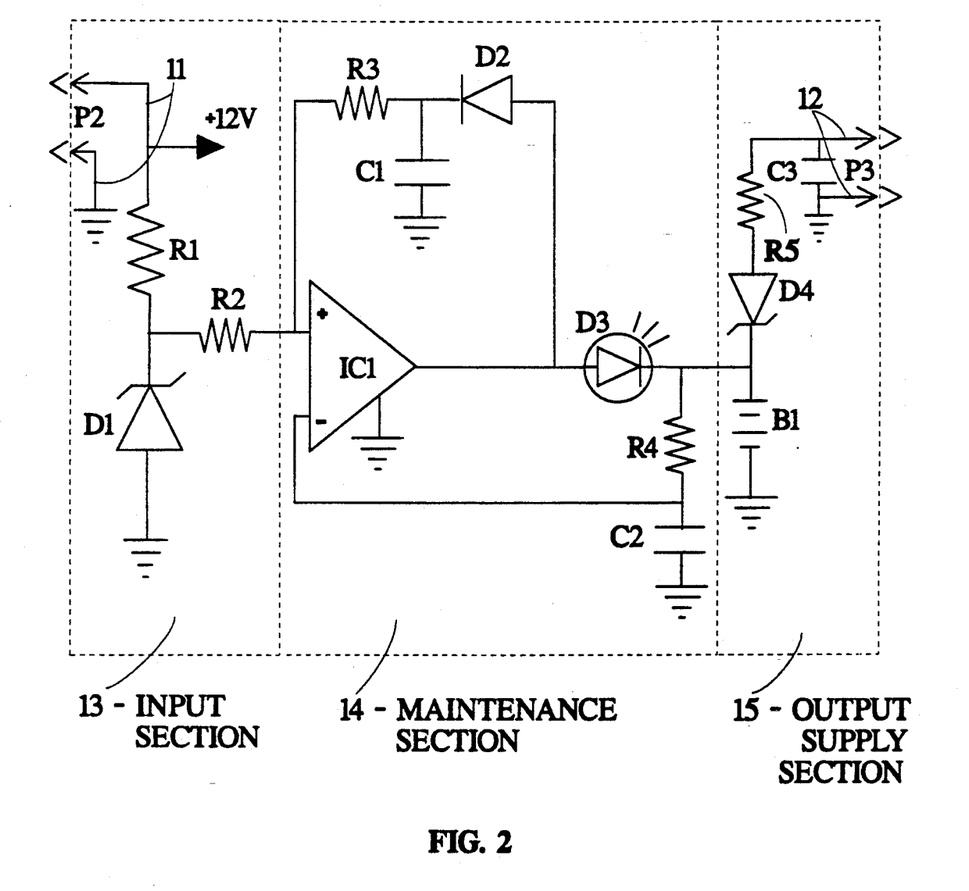
FIG. 2 shows the electronic schematic of the device which permanently supplies energy in real time, to the personal computer circuit which requires electrical energy for its battery powered memory and clock.

FIG. 2 shows the schematic of the electronic device which supplies and maintains the charge on the rechargeable battery B1. Power supplied to the critical PC memory is provided through output connector P3 which attaches to the PC motherboard. Power from +V is provided from the PC twelve volt power supply through the input connector P2 and electrical leads 11.

The input section 13 consists of connector P2, electrical leads 11, resistors R1, R2 and Zener diode D1.

IC1 furnishes the intelligence of the battery maintenance section 14 comprising:
(a) IC1
(b) Resistor R3 and capacitor C1 and
(c) Resistor R4 and capacitor C2 and
(d) Diode D2 and light emitting diode D3.

The battery output supply section 15 consists of power connector P3, electrical leads 12, zener diode D4, resistor R5, capacitor C3, and rechargeable battery B1.

Figure 3:
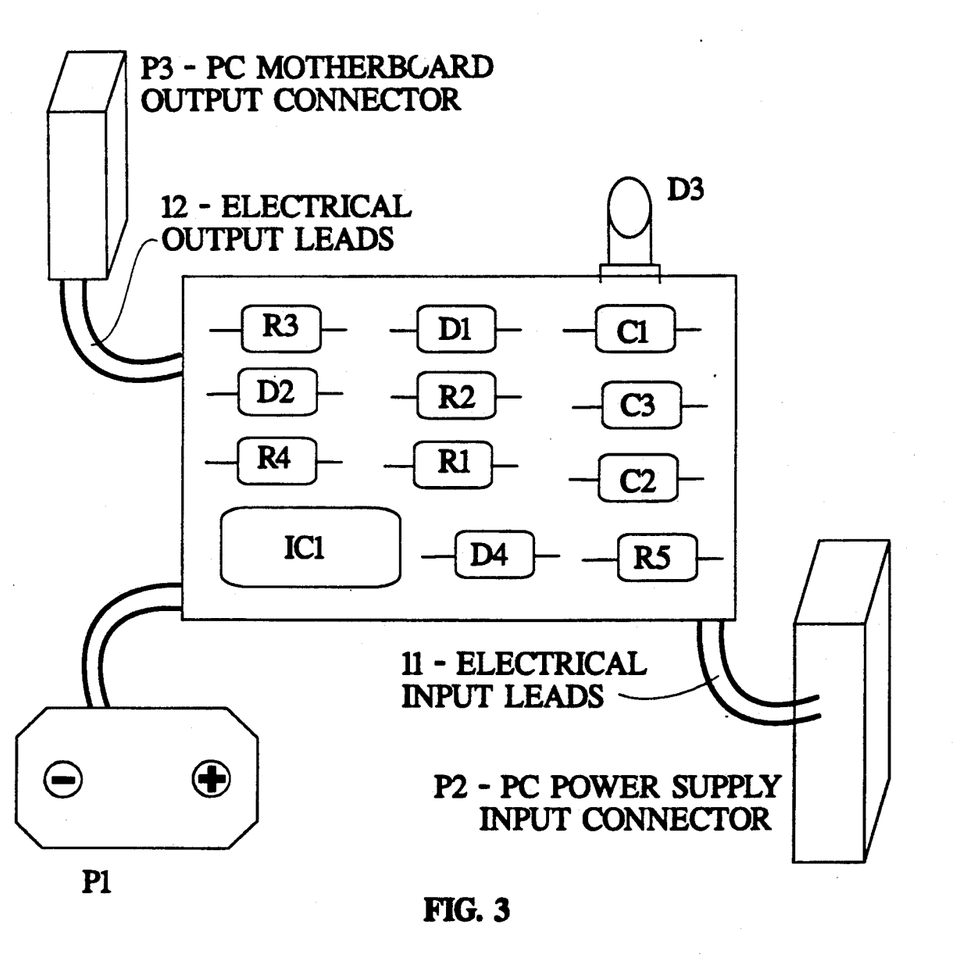
FIG. 3 shows an example circuit board containing all the physical parts and layout of the electronic components shown in FIG. 1.

FIG. 3 shows a typical embodiment of a circuit board which is a physical representation of the schematic shown in FIG. 2. Note the battery connector P1. All the components of the schematic are physically represented and labeled as in FIG. 2.

Figure 4:
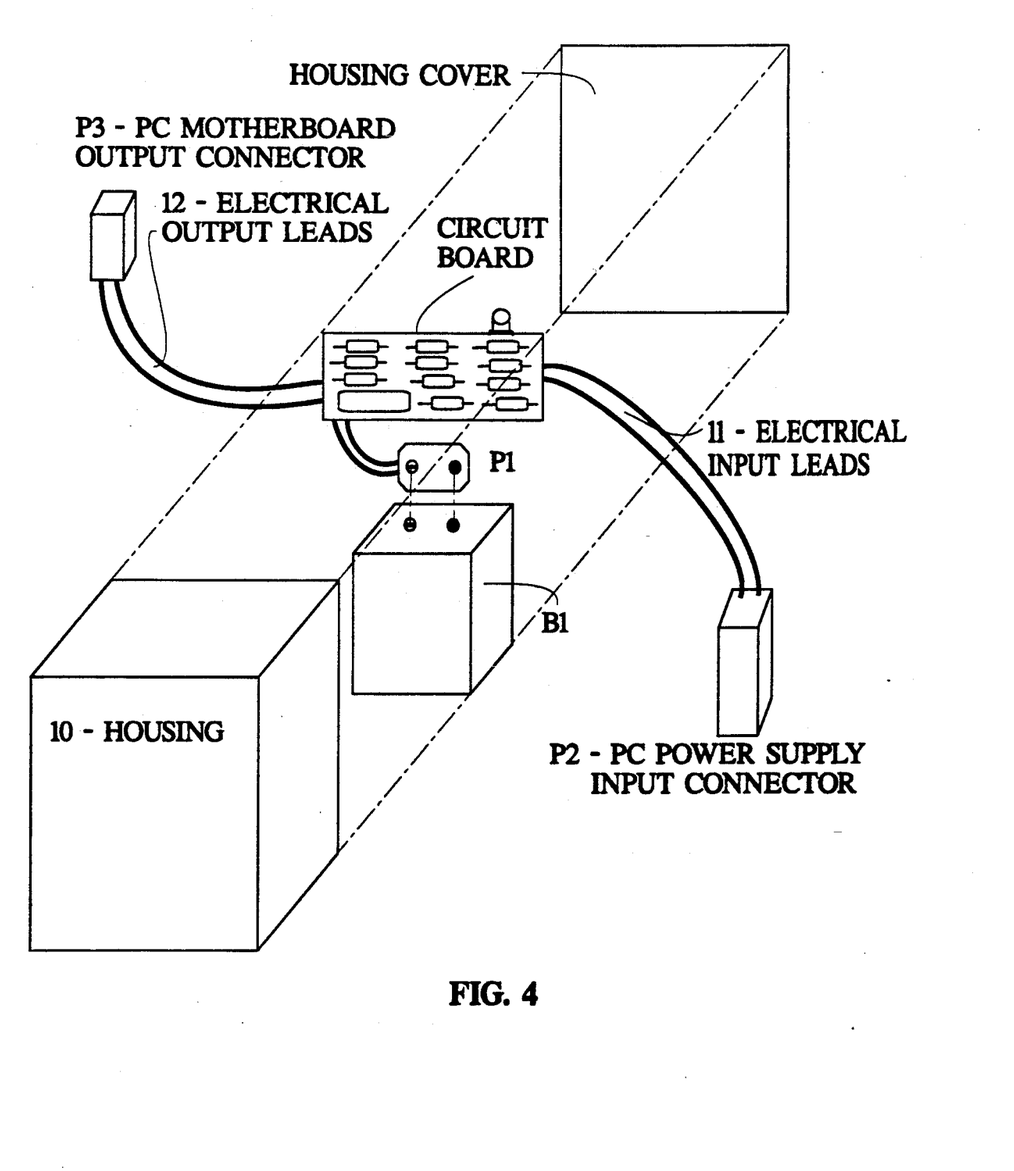
FIG. 4 illustrates (by an isometric exploded view) the complete composition of the invention.

FIG. 4 is an exploded view of the invention. The housing 10 is shown at the bottom. The Nicad battery B1 fits into the housing 10 and is connected to the circuit board at P1. The circuit board shown at the top also fits into the housing 10. When the circuit board and battery are within the housing, then only the input leads 11 and connector P2 and output leads 12 and connector P3 are external to the housing 10 as in FIG. 1.

OPERATION—FIGS. 2, 3, 5, 6, 7, 8

The operation of the electronic device which supplies and maintains the charge on the rechargeable battery depicted by the schematic of FIG. 2 and supported by the graphs shown in FIGS. 3, 5, 6, 7, and 8 will be described.

The supply voltage +V, is a regulated positive twelve volts which normally comes in through input connector P2 and leads 11 from the PC power supply. Resistor R1 and diode D1 form a voltage reference which is nominally at 8.7 volts. The input section of the circuit supplies this voltage through resistor R2, to the positive input of the operational amplifier IC1. In this circuit, IC1 acts as a voltage comparitor and begins the maintenance section of the circuit.

Figure 5:
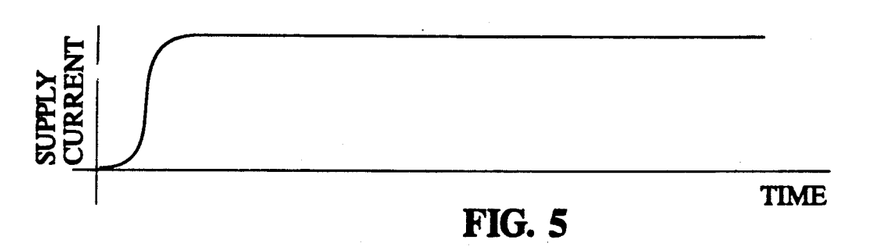
FIG. 5 shows the current provided by the electronic device to the rechargeable battery which is in a low charged state.

When B1, (typically a nine Volt Nickel-Cadmium battery) is relatively low (say seven volts), then the voltage level at the Negative (−) side of IC1 will be less than the Positive (+) side of IC1. This will cause the output of IC1 to drive high, and supply sufficient Voltage to forward bias diode D3 and provide current into rechargeable battery B1. This current is limited by IC1 to a forty milliamp maximum. In this fully charging mode, the light emitting diode (LED) D3 will be steady state ON. This fully ON charging state is depicted by FIG. 5.

Figure 8:
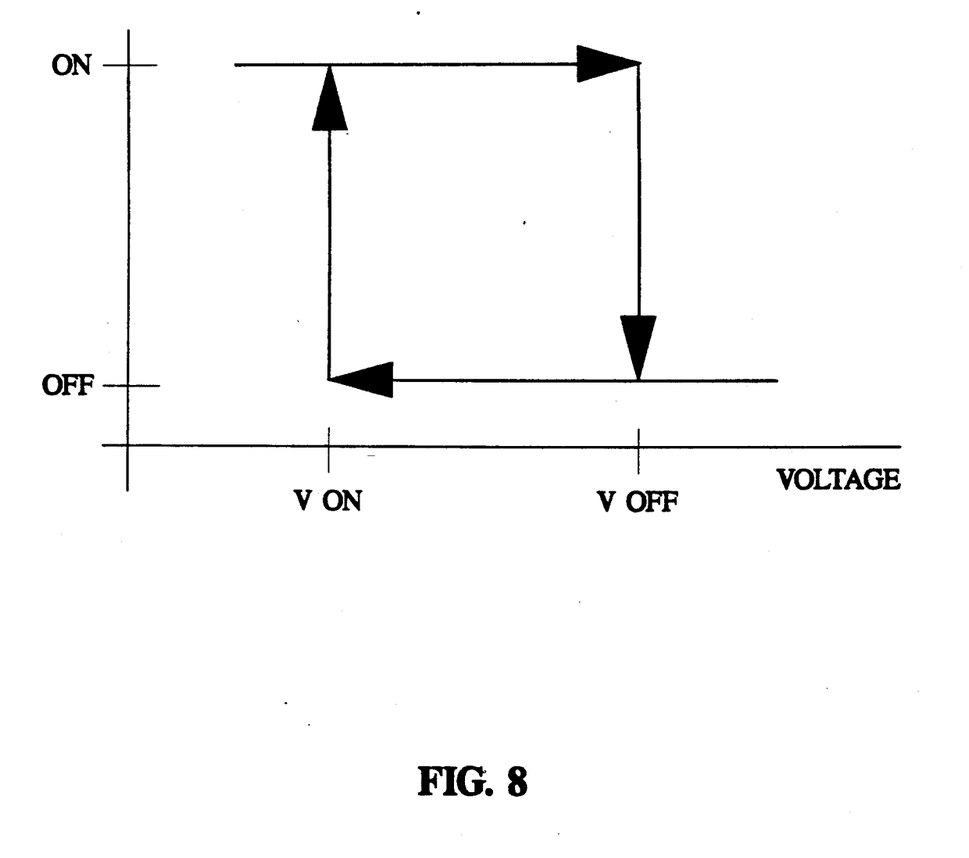
FIG. 8 shows an idealized hysteresis curve characteristic of the ON-OFF cycle of the electronic device of which a schematic is shown in FIG. 2.

During this full ON charging period, the RC time constant effects of resistor R4 and capacitor C2 as well as the time constant effects of resistor R3 and capacitor C1 do not play an active role. When the output of IC1 goes high, the diode D2 will be forward biased resulting in a voltage division across resistor R3 and resistor R2 causing the voltage at the positive (+) input of IC1 to rise a few tenths of a volt. This will ensure a minimum charging ON time due to the characteristic hysteresis of the turn ON and turn OFF voltage required at the input of the operational amplifier IC1. This characteristic hysteresis is shown in FIG. 8.

Figure 6:
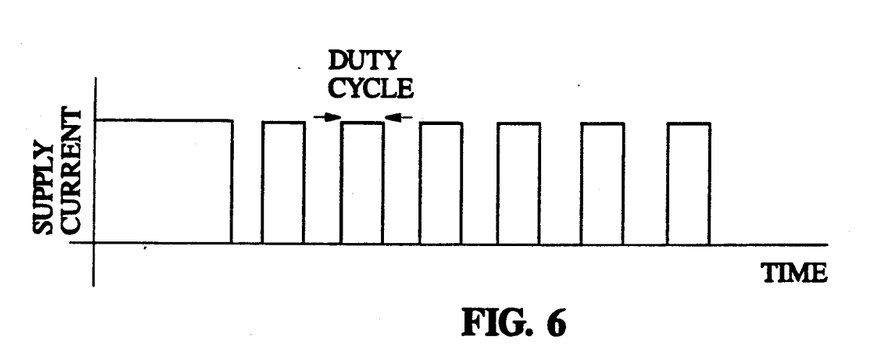
FIG. 6 shows the current provided by the electronic device to the rechargeable battery which is coming up to a full charge.

As the battery B1 approaches full charge, the voltage on its output will rise up to the required voltage to turn off IC1. The RC circuit (composed of resistor R3 and capacitor C1) and the RC circuit (composed of resistor R4 and capacitor C2) ensure a minimum ON and OFF time for IC1. During the period when rechargeable battery B1 is approaching full charge, these circuits oscillate as does the LED D3. This oscillation settles to a duty cycle of about twenty five to thiry percent ON state. This oscillation and duty cycle is shown in the graph of FIG. 6.

Figure 7:
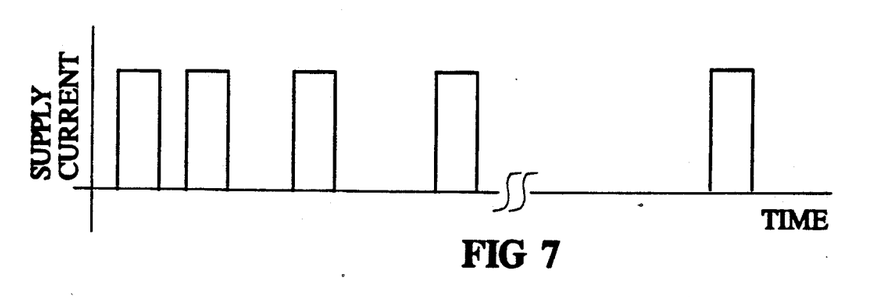
FIG. 7 shows the current provided by the electronic device to the rechargeable battery which has come up to a full charge.

Once the rechargeable battery B1 reaches a fully charged state it will maintain sufficient voltage (as opposed to surface charge) such that the charging signal produced by the operational amplifier IC1 will diminish to a pseudo steady OFF state. The term pseudo steady is used because all batteries slowly self discharge. Therefore, periodically there will be charge pulses. This pseudo steady OFF state is depicted in the graph of FIG. 7.

When a Personal Computer (PC) is turned OFF, +V becomes zero volts and the circuit consisting of power connector P3, resistor R5, capacitor C3, zener diode D4, and rechargeable battery B1 provide power to the PC's battery powered memory and clock. This is the output supply section of the circuit 15. This energy is provided from the battery B1 through the leads 12 to the output connector P3. Zener diode D4 drops the voltage from the battery B1 to below five volts as required by the PC motherboard's battery powered memory. Capacitor C3 filters this lower supply voltage and provides a resource of energy at this (below five volts) level to the PC's battery powered memory. Resistor R5 provides protection for the rechargeable battery B1, in case of an accidental short of the output at P3.

SUMMARY, RAMIFICATIONS, AND SCOPE

Thus, the reader will see that this invention provides a permanent power source for the personal computer (PC) replaceable battery. Instead of replacing the PC battery over and over, a PC user now has the option to replace the PC battery with this permanent power pack invention designed to service the PC for its lifetime. This invention increases the reliability of a PC by eliminating its unreliable, non-rechargeable, dying battery.

Consequently, the invention prevents loss of PC system configuration information and prevents a PC clock failure. The invention also eliminates the consequences of a random PC failure due to normal depletion of battery charge.

This invention allows for the elimination of the PC internal battery replacement cycle imposed upon the PC user.

This invention makes it possible to increase the reliability of the personal computer since part of its reliability is related to the reliability of the power source for its clock and its system configuration memory.

Additionally, the intelligent circuit which controls the supply and maintenance of the battery energy is designed so that the electrical strain imposed on the battery is minimized. Thus, this invention provides a very reliable PC memory and PC clock power source. Moreover, this invention helps to alleviate the battery disposal problem.

The detailed description above should not limit the scope of this invention. This description illustrates only a few of the preferred embodiments of this invention. For example, the shape of the invention could be cylindrical or have a circular representation as well as the one previously described above. Another example of this would be a different electronic housing or to replace the values of the individual electronic components.

Thus, the scope of this invention should only be determined by the claims and their legal equivalents, rather than by any of the illustrations or examples given in the above description.

We claim:

1. A permanent power pack operable from a power supply of a personal computer for providing steady, non-exhaustible electrical power to both a computer clock and a computer system configuration memory comprising an electronic circuit including input means to receive operational energy from a DC output of said computer power supply, and maintenance means to maintain charge on a rechargeable battery only when said power supply is activated, and output means to supply electrical energy to said computer clock and said computer system configuration memory when said computer power supply is deactivated, wherein

[a] said rechargeable battery is electrically connected to said maintenance means of said electronic circuit, and

[b] a housing means hold both said rechargeable battery and said electronic circuit together, and

[c] external input electrical leads are attached to an input power supply connector from said input means of said electronic circuit within said housing and external output electrical leads are attached to an output connector from said output means of said electronic circuit within said housing, and said input power supply connector is mechanically mated and electrically attachable to an original disk drive DC output power connector from said DC computer power supply, whereby said permanent power pack eliminates a non-rechargeable, disposable, consumer replaceable computer clock battery.

2. The permanent power pack of claim 1 wherein:

[a] said maintenance means is activated only by DC output from said computer power supply, and

[c] said maintenance means is composed of a specialized DC driven charging circuit, and

[d] said output connector is mechanically mated and electrically attachable to an original computer clock battery interconnect for supplying electrical power to both said computer clock and said computer system configuration memory.

3. A permanent power pack operable from a DC output of a personal computer power supply for replacing the exhaustible, temporary electrical power of a non-rechargeable, consumer replaceable, disposable, computer clock battery with non-exhaustible, steady electrical power supplying both a computer clock and a computer system configuration memory comprising an electronic circuit including input means to receive operational energy from DC output of the computer power supply, and maintenance means to maintain charge on a rechargeable battery when said computer power supply is activated, and output means to supply electrical energy to said computer clock and said computer system configuration memory when said computer power supply is deactivated, wherein

[a] said rechargeable battery is electrically connected to said maintenance means of said electronic circuit, and

[b] a housing means holds both said rechargeable battery and said electronic circuit together, and

[c] external input electrical leads are attached to an input power supply connector from said input means of said electronic circuit within said housing and external output electrical leads are attached to an output connector from said output means of said electronic circuit within said housing, and said input power supply connector is mechanically mated and electrically attachable to an original disk drive DC output power connector of said DC computer power supply, whereby said permanent power pack eliminates the non-rechargeable, consumer replaceable, disposable computer clock battery.

4. The permanent power pack of claim 3 wherein:
[a] said maintenance means is activated by DC output of said computer power supply, and
[b] said output connector is mechanically mated and electrically attachable to an original computer clock battery interconnect for supplying electrical power to both said computer clock and said computer system configuration memory.

5. A permanent power pack for supplying non-exhaustible, steady electrical power to both a computer clock and a computer system configuration memory and hence capable of eliminating an existing consumer replaceable, non-rechargeable, disposable computer clock battery which characteristically supplies exhaustible, temporary electrical power to both said computer clock and said computer system configuration memory comprising an electronic circuit including input means to receive operational energy from a direct current output of a computer power supply, and maintenance means to maintain charge on a rechargeable battery when said power supply is activated, and output means to supply electrical energy to said computer clock and said computer system configuration memory when said computer power supply is deactivated, wherein

[a] said rechargeable battery is electrically connected to said maintenance means of said electronic circuit, and
[b] a housing means holds said rechargeable battery and said electronic circuit together, and
[c] external input electrical leads are attached to an input power supply connector from said input means of said electronic circuit within said housing and external output electrical leads are attached to an output connector from said electronic circuit within said housing, and said input power supply connector is mechanically mated and electrically attachable to an original disk drive DC output power connector of said DC computer power supply, whereby said permanent power pack can permanently replace the non-rechargeable, consumer replaceable, disposable computer clock battery for the life of a personal computer.

6. The permanent power pack of claim 5 wherein:
[a] said maintenance means is activated by said direct current output of the computer power supply, and
[b] said output connector is mated with and electrically attachable to an original computer clock battery interconnect for supplying electrical power to both said computer clock and said computer system configuration memory.

* * * * *